United States Patent
Gu et al.

(10) Patent No.: US 7,487,206 B2
(45) Date of Patent: Feb. 3, 2009

(54) METHOD FOR PROVIDING LOAD DIFFUSION IN DATA STREAM CORRELATIONS

(75) Inventors: Xiaohui Gu, Chappaqua, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 696 days.

(21) Appl. No.: 11/183,149

(22) Filed: Jul. 15, 2005

(65) Prior Publication Data

US 2007/0016560 A1 Jan. 18, 2007

(51) Int. Cl.
G06F 15/16 (2006.01)
G06F 15/173 (2006.01)
G06F 7/00 (2006.01)
(52) U.S. Cl. .................. 709/203; 709/226; 707/2
(58) Field of Classification Search .......... 709/224, 709/226, 231, 232, 236, 203; 707/1–3, 10, 707/104.1
See application file for complete search history.

(56) References Cited

U.S. PATENT DOCUMENTS

| | | | |
|---|---|---|---|
| 6,366,296 B1 | 4/2002 | Boreczky et al. | |
| 6,728,753 B1 | 4/2004 | Parasnis et al. | |
| 6,850,965 B2 * | 2/2005 | Allen | 709/203 |
| 2002/0035559 A1 * | 3/2002 | Crowe et al. | 707/2 |
| 2005/0081116 A1 | 4/2005 | Bejerano et al. | |
| 2005/0169255 A1 | 8/2005 | Shimomura et al. | |
| 2006/0218123 A1 * | 9/2006 | Chowdhuri et al. | 707/2 |
| 2007/0266161 A1 | 11/2007 | Kenrick et al. | |

OTHER PUBLICATIONS

U.S. Appl. No. 11/417,838, filed May 4, 2006, Gu et al.
Ivanova et al., "Customizable Parallel Execution of Scientific Stream Queries", Proc. Of VLDB Conference, Trondheim, Norway, 2005, pp. 157-168.
Viglas et al., "Maximizing the Output Rate of Multi-Way Join Queries over Streaming Information Sources", Proc. Of VLDB Conference, Berlin, Germany, 2003, pp. 1-12.
Golab et al., "Processing Sliding Window Multi-Joins in Continuous Queries over Data Streams", Proc. Of VLDB Conference, Berlin, Germany, pp. 1-12. 2003.
Avnur et al., "Eddies: Continuously Adaptive Query Processing", Proc. Of SIGMOD, Dallas, Texas, May 2000, pp. pp. 1-12.
Tian et al., "Tuple Routing Strategies for Distributed Eddies", Proc. Of VLDB Conference, Berlin, Germany 2003, pp. 1-12.

(Continued)

*Primary Examiner*—William C. Vaughn, Jr.
*Assistant Examiner*—Peling A Shaw
(74) *Attorney, Agent, or Firm*—Duke W. Yee; Mark Wardas; Mari A. Stewart (57) ABSTRACT

A computer implemented method for performing load diffusion to process data stream pairs. A data stream pair is received for correlation. The data stream pair is partitioned into portions to meet correlation constraints for correlating data in the data stream pair to form a partitioned data stream pair. The partitioned data stream pair is sent to a set of nodes for correlation processing to perform the load diffusion.

1 Claim, 5 Drawing Sheets

OTHER PUBLICATIONS

Gomes et al., "Experimental Analysis of Approximation Algorithms for the Vertex Cover and Set Covering Problems", Computers and Operations Research, 2005, pp. 1-18.

Cybenko, "Dynamic Load Balancing for Distributed Memory Multiprocessors", Journal of Parallel and Distributed Computing 7, 1989, 0743-7315/89, pp. 279-301.

Tatbul et al, "Load Shedding in a Data Stream Manager", Proceedings of the 29th International Conference on Very Large Data Bases (VLDB), Sep. 2003, pp. 1-28.

Balazinska et al., "Contract-based Load Management in Federated Distributed Systems", Proceedings of 1st Symposium on Networked Systems Design and Implementation (NSDI), Mar. 2004, pp. 1-14.

Xing et al., "Dynamic Load Distribution in the Borealis Stream Processor", Proceedings of the International Conference on Data Engineering (ICDE), Apr. 2005, pp. 1-12.

Shah et al., "Flux: An Adaptive Partitioning Operator for Continuous Query Systems", Proceedings of the 19th International Conference on Data Engineering (ICDE), Mar. 2003, pp. 1-12.

\* cited by examiner

METHOD FOR PROVIDING LOAD DIFFUSION IN DATA STREAM CORRELATIONS

GOVERNMENT LICENSE RIGHTS

This invention was made with Government support under Contract No.: TIA H98230-04-3-0001 awarded by the U.S. Department of Defense. The Government has certain rights in this invention.

BACKGROUND OF THE INVENTION

1. Field of the Invention

The present invention relates generally to an improved data processing system, and in particular, to a method and apparatus for processing data streams. Still more particularly, the present invention relates to a method, apparatus, and computer usable program code for providing load diffusion to perform data stream correlations using a distributed stream processing system.

2. Description of the Related Art

Many emerging applications call for sophisticated real time processing of data streams. These applications are referred to as stream applications. Examples of stream applications include, for example, stock trading surveillance for fraud detection, network traffic monitoring for intrusion detection, sensor data analysis, and video surveillance. In these stream applications, data streams from external sources flow into a stream processing system, where the data streams are processed by different continuous query processing elements called "operators". These processing elements or operators may take the form of software, hardware, or some combination thereof.

To support unbounded streams, the stream processing system associates a sliding window with each stream. The window contains the most recently arrived data items on the stream called tuples. A tuple is a set of values. The window can be time-based or tuple-based. A time based window may be, for example, tuples arriving in the last 10 minutes, while a tuple based window may be, for example, the last 1000 tuples. One of the important continuous query operators is sliding window join between two streams, streams $S_1$ and $S_2$. The output of this window join contains every pair of tuples from streams $S_1$ and $S_2$ that satisfies the join predicate and are simultaneously present in their respective windows.

The join predicate is a comparison function over one or more common attributes between two tuples. The basic join predicate is an equality comparison between two tuples $s_1$ and $s_2$ over a common attribute A, denoted by $s_1 \cdot A = s_2 \cdot A$. The sliding window join has many applications. For example, consider two streams in which one stream contains phone call records and the other stream contains stock trading records. A sliding window join that operates to correlate or join between the suspicious phone calls and anomalous trading records over the common attribute "trade identifier" can be used to generate trading fraud alerts.

In many cases, stream applications require immediate on-line results, which implies that query processing should use in-memory processing as much as possible. However, given high stream rates and large window sizes, even a single sliding window join operator can have a large memory requirement. Moreover, some query processing, such as video analysis can also be computation-intensive. Thus, a single server may not have sufficient resources to produce accurate join results while keeping up with high input rates. Currently, two basic solutions are present to address the challenge: shedding part of workload by providing approximate query results, or offloading part of workload to other servers.

Much work on stream processing has been performed to provide efficient resource management for a single server site. To further scale up stream processing, recent work has proposed to process high-volume data streams using distributed stream processing systems. This solution proposes a dynamic load distribution algorithm that provides coarse-grained load balancing at inter-operator level. However, the inter-operator load distribution alone may not be sufficient since this type of load distribution does not allow a single operator to collectively use resources on multiple servers. For example, if an operator requires 40 KB memory while each single server has only 39 KB available memory, the coarse-grained scheme cannot execute the operator with full precision although the whole server cluster has sufficient available memory. Another solution has studied the intra-operator load distribution for processing a single windowed aggregate operator on multiple servers.

Although load balancing and load sharing have been extensively studied in conventional distributed and parallel computing environments, they are not directly applicable to dynamic stream environments. First, stream processing system executes long-running query computations over unbounded data streams. Thus, any static load distribution algorithms cannot be used since load conditions can vary in unpredictable ways. Second, the load punctuation in the stream processing system is caused not only by different queries presented to the system, but also changing stream rates that can present transient spikes. Resource management must adapt to dynamic stream environments since the system cannot control the rates of input streams from external sources. Third, windowed stream joins require the load balancing algorithm to satisfy a new correlation constraint that correlated tuples must be sent to the same server for producing accurate join results. The correlated tuples include those tuples that need to be joined based on the sliding window definition.

SUMMARY OF THE INVENTION

The different aspects of the present invention provide a computer implemented method for performing load diffusion to perform correlations over two data streams using a distributed stream processing system. The data streams are dynamically partitioned and distributed among a set of server nodes to diffuse the stream correlation workload. The stream partition method satisfies the correlation constraint that the correlated data are guaranteed to sent to the same server node.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
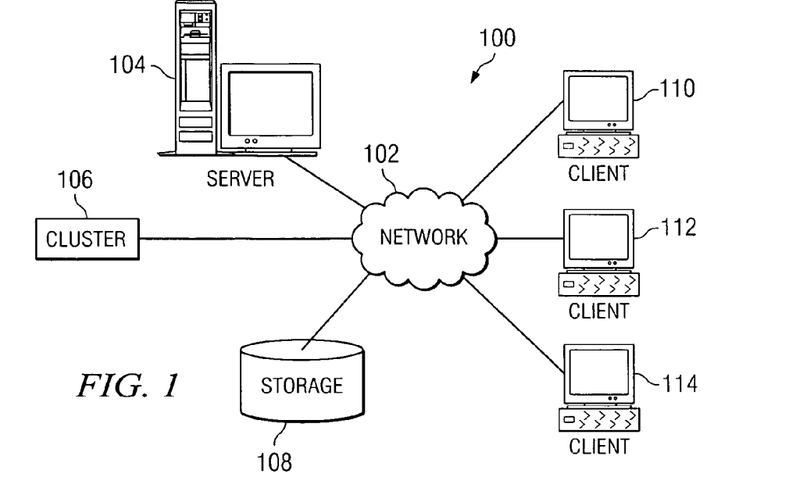
FIG. 1 is a pictorial representation of a network of data processing systems in which aspects of the present invention may be implemented.
Figure 2:
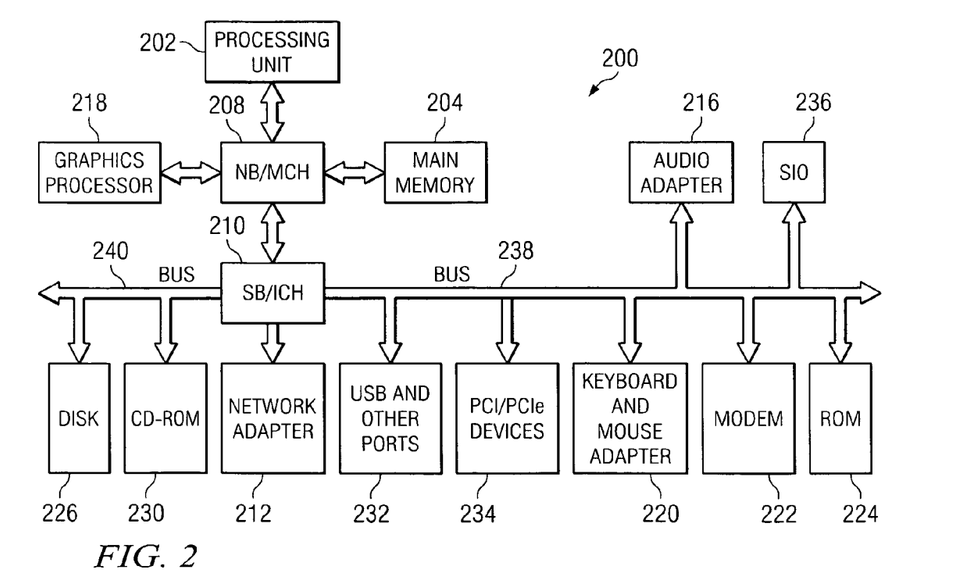
FIG. 2 is a block diagram of a data processing system in which aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and cluster 106 connect to network 102 along with storage unit 108. In addition, clients 110, 112, and 114 connect to network 102. These clients 110, 112, and 114 may be, for example, personal computers or network computers. In the depicted example, server 104 and cluster 106 provide data, such as boot files, operating system images, and applications to clients 110, 112, and 114.

In particular, server 104 and cluster 106 work together to provide load diffusion for stream correlation or join operations. These streams are received from a client, such as client 110. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 208 and south bridge and input/output (I/O) controller hub (ICH) 210. Processing unit 202, main memory 204, and graphics processor 218 are connected to north bridge and memory controller hub 208. Graphics processor 218 may be connected to north bridge and memory controller hub 208 through an accelerated graphics port (AGP).

In the depicted example, local area network (LAN) adapter 212, audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 210 through bus 238. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 210 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 210.

An operating system runs on processing unit 202 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 202. Alternatively, a single processor system may be employed.

Instructions for the operating system, the object-oriented programming system, and applications or programs are located on storage devices, such as hard disk drive 226, and may be loaded into main memory 204 for execution by processing unit 202. The processes for embodiments of the present invention are performed by processing unit 202 using computer usable program code, which may be located in a memory such as, for example, main memory 204, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 204, read only memory 224, or a cache such as found in north bridge and memory controller hub 208 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The different aspects of the present invention focus on distributing the stream correlation workload among different servers. This approach involves an adaptive load diffusion scheme to efficiently execute sliding window stream joins (i.e., stream correlations) using a cluster of servers connected by high-speed networks. The different embodiments of the present invention consider both intra-operator and inter-operator load distribution, which are not taken into account by present available systems. The different aspects include supporting distributed executions of sliding window stream joins on a server cluster.

More specifically, aspects of the present invention provide a computer implemented method, apparatus, and computer usable program code for an adaptive load diffusion scheme to adaptively distribute stream join workload among a cluster of servers. The aspects of the present invention provide scalable stream joins by efficiently utilizing all available resources in a server cluster. A set of stream partition processes are used to continuously and adaptively diffuse stream processing workload among all servers.

In the different embodiments, the stream partition process dynamically splits an input stream into multiple logic streams, each of which only contains a subset of tuples of the original input stream. The tuples in these logic streams are routed to different servers for concurrent processing. Hence, each server only shares a partial workload because each server only processes a subset of tuples of the original stream. However, due to the correlation constraint, two joined streams cannot be partitioned independently. The stream partition processes used in the illustrative embodiments observe the correlation constraint using different schemes, such as replication and overlapped segmentation.

The illustrative embodiments first analyze the tradeoffs between different stream partition processes in terms of performance and overhead. Then, a set of adaptation strategies are employed to achieve adaptive load diffusion for dynamic stream environments.

In the illustrative examples, the load diffusion processes are implemented as a middleware proxy service. The load diffusion proxy service is implemented in the illustrative examples in a load diffusion proxy that virtualizes a cluster of stream processing servers into a unified stream processing service. The load diffusion proxy is designed for real-time on-line stream processing. The major operation performed by the load diffusion proxy is to route tuples to proper servers according to the load diffusion algorithm and the load conditions of different servers.

The load diffusion proxy is not a bottleneck of scalability because its function can be easily replicated, with the constraint that the pair of streams belonging to the same join operator passes through a single load diffusion proxy. In other words, although the illustrative examples depict a single load diffusion proxy, additional load diffusion proxies may be used depending on the implementation.

The load diffusion system of the present invention includes a distributed stream processing system architecture, a structure for the load diffusion middleware proxy, a stream processing model, and system monitoring schemes.

Figure 3:
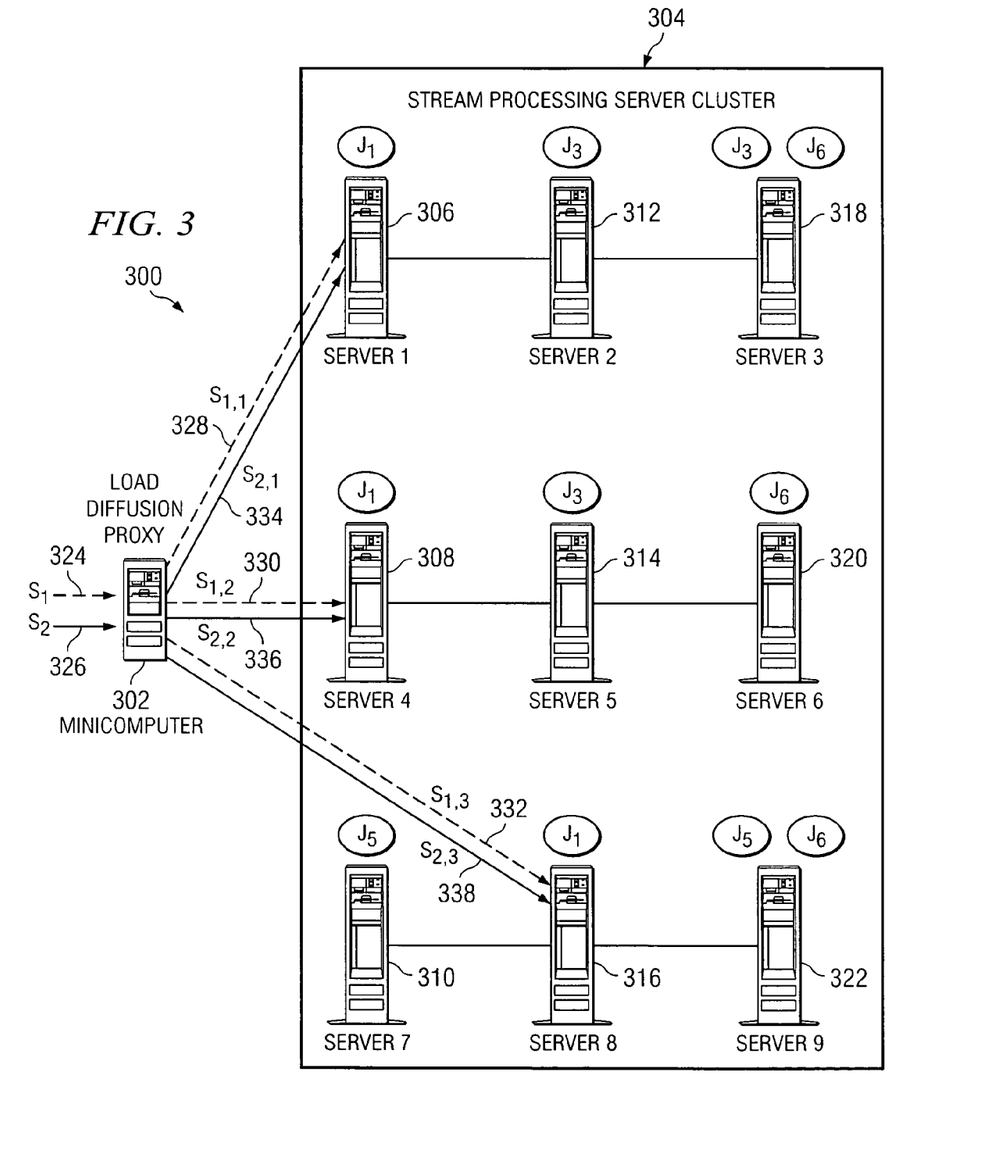
FIG. 3 is a diagram of a distributed stream processing system in accordance with an illustrative embodiment of the present invention.

Turning now to FIG. 3, a diagram of a distributed stream processing system is illustrated in accordance with an illustrative embodiment of the present invention. Distributed stream processing system 300 is implemented using load diffusion proxy 302 and cluster 304. Load diffusion proxy 302 and cluster 304 are similar to server 104 and cluster 106 in FIG. 1. Cluster 304 contains servers 306, 308, 310, 312, 314, 316, 318, 320, and 322. The different servers shown in FIG. 3 may be implemented using a data processing system, such as data processing system 200 in FIG. 2.

In this example, 300 receives stream $S_1$ 322 and stream $S_2$ 324 for processing. In particular, these two streams are received for processing using a join operation to correlate the tuple pair on the stream $S_1$ 322 and stream $S_2$ 324 based on a predefined join predicate (e.g., equal value over a common attribute A between two tuples $s_1$ and $s_2$, denoted by $s_1 \cdot A = s_2 \cdot A$).

Each server node in cluster 304 has a limited memory capacity $M_i$ for buffering tuples, and a certain processor processing speed that can process on average $N_i$ join operations per time unit. Data streams are pushed into the distributed stream processing system from various external sources, such as, for example, temperature sensors, stock tickers, and video cameras. Distributed stream processing system 300 appears to a client as a unified stream processing service to serve a large number of continuous query processing over high volume data streams. This environment is a push-based stream environment in these examples and includes two unique features: (1) the tuples of a single stream can arrive in a bursty fashion; and (2) tuples are pushed into the system where data arrivals cannot be controlled by the system. A bursty arrival is, for example, a large number of tuples that arrive in a short period of time.

Load diffusion proxy 302 serves as a gateway of distributed stream processing system 300 to distribute stream processing workload across servers within cluster 304. Of course additional load diffusion proxies may be used in addition to load diffusion proxy 302, depending on the particular implementation. For each stream join request received from a client, load diffusion proxy 302 selects a number of servers to instantiate the join operator. The load diffusion proxy intercepts input streams and re-directs them to proper servers in cluster 304 responsible for handling the stream joins. Due to the memory and processor speed limits, a single server can only accommodate a certain data arrival rate in order to keep the unprocessed data in the memory. When tuples arrive too fast, the server has to drop tuples using some load shedding technique. However, dropping data can affect the accuracy of stream join results. In contrast, distributed stream processing system 300 avoids dropping data by spreading stream join workload across multiple servers within cluster 304.

The load diffusion proxy realizes fine-grained and balanced workload distribution using adaptive stream partitions. The stream partition process used in the different illustrative examples can adaptively split a high-volume stream into multiple logic streams, each of which are sent to different servers for concurrent processing. Conceptually, the load diffusion proxy decomposes a single resource-intensive join operator into multiple operators executed on different servers within cluster 304. Each operator only processes a subset of tuples on the original input streams.

For example, in FIG. 3, the load diffusion proxy splits the stream $S_1$ 324 into three logic streams, stream $S_{1,1}$ 328, stream $S_{1,2}$ 330, and stream $S_{1,3}$ 322, that are sent to the servers 306, 308, and 316, respectively. Stream $S_2$ 326 is replicated to form stream $S_{2,1}$ 334, stream $S_{2,2}$ 336, and stream $S_{2,3}$ 338. These replicated streams are sent to each of the servers. This type of partition is referred to as a single stream partition (SSP) process. Another type of partitioning process for load diffusion used in these illustrative examples is a coupled stream partition (CSP) process in which both streams are partitioned. Each stream has a lower stream rate than the original stream in these examples. Different from load distribution in traditional distributed computing environments, the load diffusion scheme of the present invention sends correlated data to the same server, which is called the correlation constraint. For example, if the load diffusion proxy sends the tuple $s_1$ on the first stream $S_1$ to a server node $v_i$, all the tuples $s_2$ on the second stream $S_2$ within the sliding window $[s_1 \cdot t - W_2, s_1 \cdot t + W_2]$ must be send to the same server node $v_i$, where $s_1 \cdot t$ denote the timestamp of the tuple $s_1$ and $W_2$ denote the sliding window size on the second stream $S_2$. By observing the correlation constraint, the load diffusion proxy maintains the accuracy of the stream join results.

For the different aspects of the present invention the stream processing model is implemented in distributed stream processing system 300 in FIG. 3. A data stream, denoted by $S_i$, consists of a sequence of tuples denoted by $s_i \epsilon S_i$. In a stream $S_i$, a variable number of tuples arrive in each time unit. The time unit applies to any discrete time domain such as second or minute. In these examples, ri is used to denote the average arrival rate of the stream $S_i$. In a dynamic stream environment, the average stream rate ri can change over time. An assumption is made that each tuple $s_i \chi S_i$ carries a time-stamp $s_i \cdot t$ to denote the time when the tuple arrives on the stream $S_i$. $Si[W_i]$ is used to denote a sliding window on the stream Si, where $W_i$ denotes the length of the window in time units. The depicted examples employ time-based windows. Tuple-based windows can be translated into time-based windows by assuming that a single tuple arrives every time unit. At a time t, $s_i$ belongs to $S_i[W_i]$ if $s_1$ arrives on $S_i$ in the time interval $[t-W_i \cdot t]$ Load diffusion proxy 302 adopts a two-level hierarchical approach to distributing workload among all servers within cluster 304. For each stream join request received, load diffusion proxy 302 first selects a server set, such as servers 306-322 for processing the data streams using a stream join operation. The server set is selected is based on the current load conditions of different servers. For example, we can allocate k least-loaded servers to each join operation, where k is a configurable system parameter. Each server node in the server set creates an instance of a join operator. Different join operators can have overlapped server sets, which allows the join operators to share resources on the same server. For example, in FIG. 3, two join operators $J_3$ and $J_6$ are concurrently running on the same server 318. For each tuple that arrives on a stream belonging to a join operator, load diffusion proxy 302 selects one server node from the server set according to different stream partition processes and the current load conditions of different server nodes in these illustrative examples.

Load diffusion proxy 302 can use different stream partition processes for different join operators. Load diffusion proxy 302 selects proper stream partition processes for each join operator $J_i = S_1[W_1] \bowtie_A S_2[W_2]$ based on the properties of its input streams $S_1$ and $S_2$. Load diffusion proxy 302 can adaptively adjust algorithm parameters or switch algorithms when streams properties change.

For example, in FIG. 3, the join operator $J_1$ is instantiated on the server set containing servers 306, 308, and 316 and the join operator $J_3$ is instantiated on the server set containing servers 312 318, and 314. The load diffusion proxy can use different algorithms for diffusing the workload of $J_1$ and $J_3$. This hierarchical approach has two advantages. First, this approach allows each sliding window join operator to scale independently by adding more resources to its server set. Second, this approach allows each sliding window join operator to adapt independently to the changes of its joined streams. On the other hand, load diffusion proxy 302 still allows different operators to share resources on the same server by supporting overlapped server set.

Load diffusion proxy 302 virtualizes the collection of networked servers into a unified stream processing service. Load diffusion proxy 302 is designed to be fast, simple, and lightweight in these illustrative examples. These features are useful for real-time data stream processing. Load diffusion proxy 302 performs two operations in these examples: (1) maintains limited soft states (e.g., server loads, stream rates); and (2) routes tuples to proper servers. The examples assume that each tuple carries a time stamp and a stream identifier for use in processing by load diffusion proxy 302. The load diffusion proxy maintains a table that maps the stream identifier to the join operator $J_k$ it belongs to.

The information about join $J_k$ includes the set of servers responsible for handling $J_k$ and the current stream partition process for diffusing the workload of $J_k$. Compared to the resource-intensive stream join processing, the operation performed by the load diffusion proxy in the illustrative examples is simple and fast. Thus, load diffusion proxy 302 is not a bottleneck in a distributed stream processing system because the function load diffusion proxy 302 can be easily replicated on multiple physical hosts. With additional proxies the pair of streams belonging to the same join operator should pass through the same physical host for load diffusion.

Load diffusion proxy 302 maintains dynamic information about load conditions of different server nodes in cluster 304 and properties of input streams for efficient decision making. Each server in cluster 304 has a processor speed that can process at most $N_i$ join operations per time unit. To keep track of processor load condition, each server records the number of join operations $N'_i$ required by all the join operators on the server. In this manner, the server's processor load can be derived using the percentage $N'_i/N_i$. For example, if a server can process 100 join operations per time unit and if all the operators on the server $v_i$ require the processor to process 50 join operations per time unit, the server's processor load is 50 percent.

Besides monitoring processor usage, the load diffusion proxy 302 also monitors the memory usage of join operators instantiated on the different servers within cluster 304 in these illustrative examples. Each join operator is associated with two queues for buffering tuples arrived on the two joined streams. The lengths of queues reflect the memory requirement of the join operator, which are affected by the tuple arrival rates, processor processing rate, and the sliding window sizes. Since each server node can host multiple join operators, the queue length of a server node is defined as the sum of queue lengths of all the operators currently running on the server. Load diffusion proxy 302 maintains the processor and memory usage information of all server nodes. Each server is responsible for periodically refreshing its load condition soft states on the load diffusion proxy.

The load diffusion proxy also continuously monitors the tuple arrival rate of each input stream handled by 300. Because stream rates can dynamically vary over time, the load diffusion proxy performs periodical sampling to maintain updated average stream rate for each input stream. Specifically, load diffusion proxy 302 keeps a counter for each input stream to record the number of arrived tuples within a sampling period. The average arrival rate of the input stream can be estimated by dividing the counter value by the sampling period.

Figure 4:
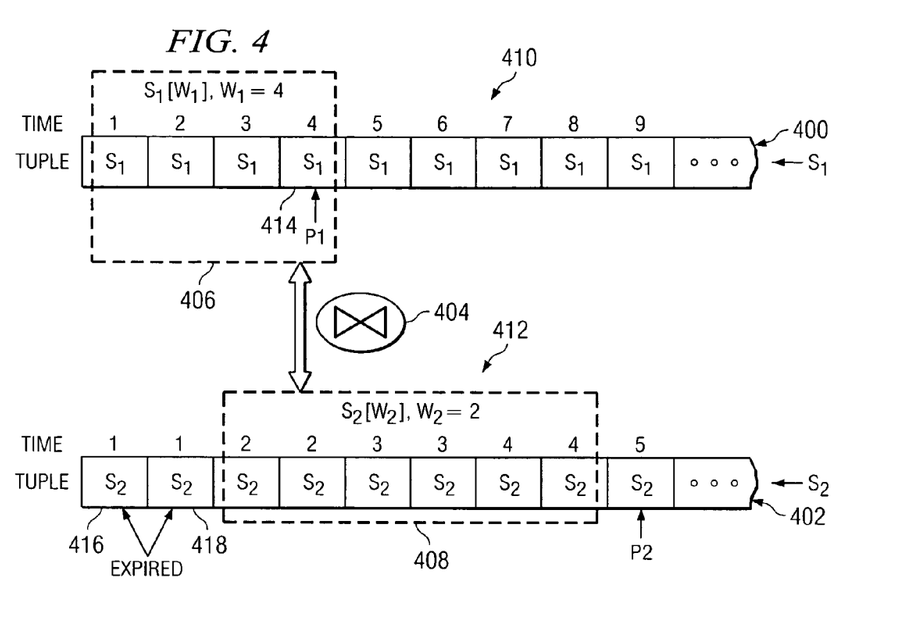
FIG. 4 is a diagram of a sliding window stream join operator model in accordance with an illustrative embodiment of the present invention.

Turning to FIG. 4, a diagram of a sliding window stream join operator model is depicted in accordance with an illustrative embodiment of the present invention. The basic stream processing operator considered in this illustrative example is a sliding window symmetric join between two streams, stream $S_1$ 400 and stream $S_2$ 402, over a common attribute A, denoted by $J_i = S_1[W_1] \bowtie_A S_2[W_2]$. The join process for this join operator is shown as join operator 404. Join operator 404 is a symmetric example of a join operator such as those illustrated and described in FIG. 3. Join operator 404 uses windows $W_1$ 406 and $W_2$ 408 to perform a join operation.

The output of the join operation consists of all pairs of tuples $s_1 \chi S_1$, $s_2 \chi S_2$, such that $s_1 \cdot A = s_2 \cdot A$ and $s_2 \chi S_2[W_2]$ at time $s_1 \cdot t$ (i.e., $s_2 \cdot t \in [s_1 \cdot t - W_2; s_1 \cdot t]$) or $s_1 \in S_1[W_1]$ at time $s_2 \cdot t$ (i.e., $s_1 \cdot t \; C \; [s_2 \cdot t - W_1, s_2 \cdot t]$) Each processing operation performed between the tuples on the two streams, streams $S_1$ 400 and $S_2$ 402, over a common attribute is one join operation. Join operator 404 maintains two queues, queue $Q_1$ 410, and queue $Q_2$ 412, for buffering incoming tuples from the streams $S_1$ 400 and $S_2$ 402, respectively.

When a new tuple $s_i \chi S_i$; 1[i[2 arrives, this new tuple is inserted into the corresponding queue $Q_i$ if queue $Q_i$ is not full. Otherwise, the operator 404 either drops the newly arrived tuple or replace an old tuple in the buffer with the newly arrived tuple. The tuples in both queues, queue $Q_1$ 410, and queue $Q_2$ 412, are processed according to the temporal order, i.e., if $s_1 \cdot t \chi Q_1 < s_2 \cdot t \chi Q_2$, $s_1$ is processed first. Each queue $Q_i$, i=1, 2 maintains a pointer $p_i$ to refer to the tuple currently processed by the join operator.

In this example, the sliding window join algorithm implemented in join operator 404 processes a tuple $s_1 \chi Q_1$ by first updating $Q_2$ by removing expired tuples. A tuple $s_2$ is expired if (1) it arrives earlier than $s_1 \cdot t - W_2$ and (2) it has been processed by the join operator (i.e., $p_2$ points to a tuple arrived later than $s_2$). For example, in FIG. 4, join operator 404 is processing tuple 414, which arrived on the stream $S_1$ 400 at time 4. The window size of window $W_2$ 408 is 2 time units. Thus, the expired tuples include those tuples arrived on $S_2$ before time 2, such as tuples 416 and 418. These two tuples are deleted from queue $Q_2$ 412. Operator 404 produces join results between tuple $S_1$ and tuple $S_2[W_2]$, denoted by $s_1 \bowtie_A S_2[W_2]$ by comparing $s_1 \cdot A$ and $s_2 \cdot A, \ldots s_2 \chi S_2[W_2]$.

Join operator 404 then updates the pointer p1 to refer to the next tuple in $Q_1$. Join operator 404 decide which tuple to process next by comparing $s_1$:t and $s_2$:t, where $s_1$ and $s_2$ are the tuples pointed by $p_1$ and $p_2$, respectively.

The join operation described in FIG. 4 is performed by multiple servers for the stream $S_1$ 400 and stream $S_2$ 402. This process occurs through different types of partitioning process. One partitioning scheme used in the illustrative examples, is a simple stream partition (SSP) process. This process the correlation constraint using replication. The basic idea is to replicate one of the two joined streams by sending each tuple of one of the streams to all servers allocated to the join operator. This stream is called the replicated stream. The other stream is then partition and its tuples are spread among all the servers. This stream is called the partitioned stream. The tuples of the partitioned stream are freely distributed because all the correlated tuples required by the partitioned stream are on the replicated stream, which have replicas on all servers.

Figure 5:
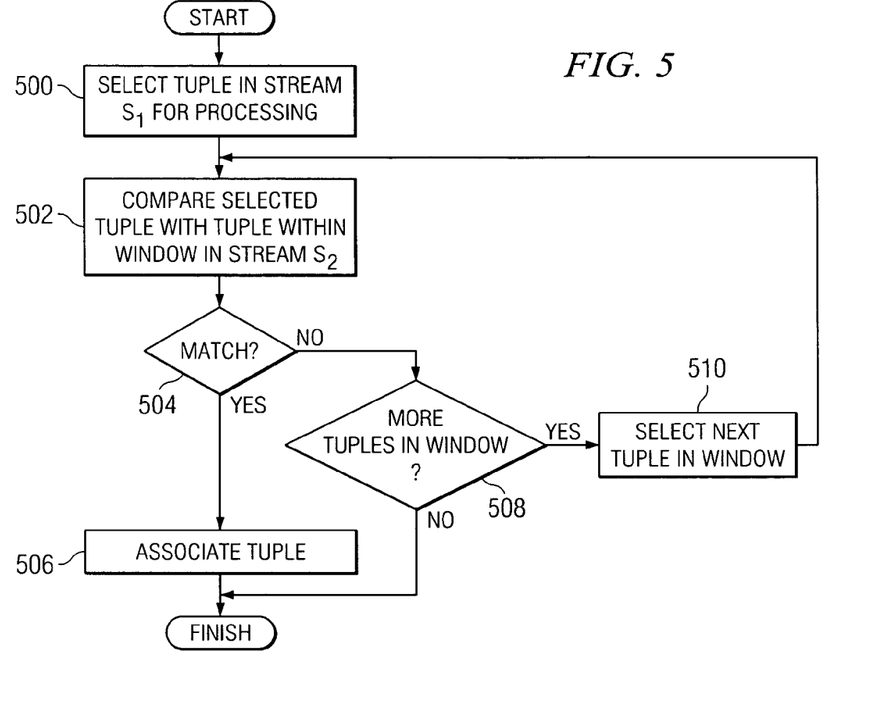
FIG. 5 is a flowchart of a sliding window stream join operation in accordance with an illustrative embodiment of the present invention.

With reference to FIG. 5, a flowchart of a sliding window stream join operation is depicted in accordance with an illustrative embodiment of the present invention. The process illustrated in FIG. 5 may be implemented in a join operator such as those depicted in cluster 304 in FIG. 3. In these examples, the processing is a join operation used to correlate or pair up tuples located in two streams.

The process begins by selecting a tuple in stream $S_1$ for processing (step 500). The selected tuple is compared with the tuple within the window in stream $S_2$ (step 502). A parameter is used to make the comparison in step 502. Next, a determination is made as to whether a match is present (step 504). If a match is present, the tuples are associated (step 506), with the process terminating thereafter. If a match is not present, a determination is made as to whether more tuples in the window are present (step 508). If more tuples in the window are not present, the process terminates. If more tuples in the window are present, the next tuple in the window is selected for processing (step 510), with the process returning to step 502 to compare the selected tuple with the tuple within the window in stream $S_2$.

Figure 6:
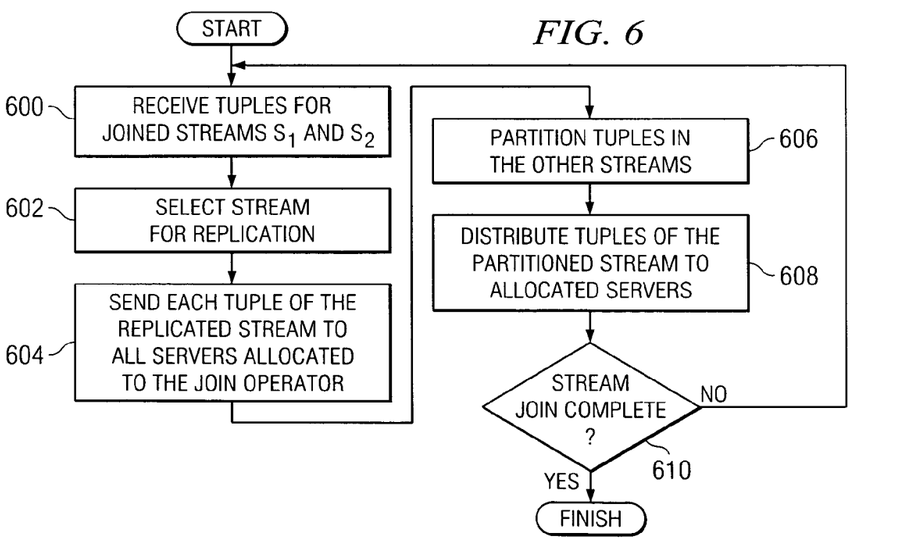
FIG. 6 is a flowchart of a single stream partition process for diffusing the workload of the stream join operation in accordance with an illustrative embodiment of the present invention.

With reference now to FIG. 6, a flowchart of a single stream partition process for diffusing the workload of the stream join operation is depicted in accordance with an illustrative embodiment of the present invention. The process illustrated FIG. 6 may be implemented in a load diffusion proxy, such as load diffusion proxy 302 in FIG. 3. This process is used to partition and distribute incoming data streams for processing.

The process begins by receiving tuples for joined streams $S_1$ and $S_2$ (step 600). One of these streams is selected for replication (step 602). Each tuple of the replicated stream is sent to all servers allocated to the join operator (step 604). The other stream is partitioned into portions (step 606). The tuples of the partitioned stream are distributed to the allocated servers (step 608). Next, a determination is made as to whether processing of the stream join operation is complete (step 610). This determination is made in these examples by seeing whether additional tuples are to be received for the streams.

If the joined streams are not complete, the process returns to step 600. Otherwise, the process terminates.

The following is a more detailed description verifying the single stream partition process used in the illustrative examples. In particular, consider a join operator $J_i = S_1[W_1] \bowtie_A S_2[W_2]$ between the two streams $S_1$ and $S_2$ whose average arrival rates are $r_1$ and $r_2$, respectively. Suppose $\{v_1, \ldots, v_k\}$ is the server set allocated to the join operator $J_i$. Assume that stream $S_1$ is the partitioned stream and stream $S_2$ is the replicated stream. For each tuple $s_1$ arriving at the stream $S_1$, the single stream partition process sends $S_1$ to the least-loaded server that has the lowest processor load. If two servers have the same processor load, the tie is broken using their queue lengths.

The server with shorter queue length is considered as the least-loaded server. For each tuple $s_2$ arriving at the stream $S_2$, the single stream partition process replicates $s_2$ into k copies that are sent to the k servers, respectively. By spreading the tuples of stream $S_1$ among all k servers, the workload of the join operator $J_i = S_1[W_1] \bowtie_A S_2[W_2]$ is diffused among all k servers since each server only processes a subset of required join operations. The correctness of the single stream partition process that the diffused join operator executes the same set of join operations as the original join operator is proved. $C(J_i)$ and $C'(J_i)$ are used to denote the sets of join operations performed by the original join operator and by the diffused join operator, respectively. The correctness of the single stream partition process is proved by showing that $C(J_i) = C'(J_i)$.

Theorem 1. Let $C(J_i)$ and $C'(J_i)$ denote the sets of join operations performed by the original join operator and the new join operator diffused by the single stream partition process, respectively. $C(J_i) = C'(J_i)$.

Proof. First prove (1) $C(J_i) \subseteq C'(J_i)$ by showing that ... $s_1$, if $s_1 \bowtie_A S_2[W_2] \chi C(J_i)$, then $s_1 \bowtie_A S_2[W_2] 2 C'(J_i)$, and ... $s_2$, if $s_2 \bowtie_A S_1[W_1] 2 C(J_i)$, then $s_2 \bowtie_A S_1[W_1] \chi C'(J_i)$. Suppose the single stream partition process sends $s_1$ to the server $v_i$. Because single stream partition replicates the stream $S_2$ on all servers, $S_2[W_2]$ must be present on the server $v_i$, too. Thus, $s_1 \bowtie_A S_2[W_2] \chi C'(J_i)$. Now prove ... $s_2$, if $s_2 \bowtie_A S_1[W_1] \chi C(J_i)$, then $s_2 \bowtie_A S_1[W_1] \chi C'(J_i)$. For any $s_2 \chi S_2$, $s_2$ needs to join every tuple in $S_1[W_1]$. Suppose single stream partition sends $s_1 \chi S[W_1]$ to the server $v_i$. Because $s_2$ is also present at $v_i$, $s_2 \bowtie_A s_1 \chi C'(J_i)$ is present. By aggregating the results of $s_2 \bowtie_A s_1; \ldots s_1 \chi S_1[W_1], s_2 \bowtie_A S_1[W_1] \chi C'(J_i)$ is obtained. Thus, $C(J_i) \subseteq C'(J_i)$ is obtained.

Next, (2) $C'(J_i) \subseteq C(J_i)$ is proved by showing that ... $s_1$, if $s_1 \bowtie_A S_2[W_2] 2 C0(J_i)$, then $s_1 \bowtie_A S_2[W_2] \chi C(J_i)$, and ... $s_2$, if $s_2 \bowtie_A S_1[W_1] \subseteq C'(J_i)$, then $s_2 \bowtie_A S_1[W_1] \chi C(J_i)$. The proof is straightforward since any join operation in $C'(J_i)$ follows the windowed join definition, which thus should appear in $C(J_i)$, too. Because ... $s_1 \chi S_1$, $s_1$ is only sent to one server, two different servers do not perform duplicated join operations. Thus, $C'(J_i) \subseteq C(J_i)$ is obtained. Combining (1) and (2), $C(J_i) = C'(J_i)$ is obtained.

The memory requirement of the windowed join operator $J_i = S_1[W_1] \bowtie_A S_2[W_2]$ is analyzed. Without load diffusion, the original join operator is executed on a single server $v_i$. Let $\sigma$ denote the average tuple size. The server needs a minimum memory space for buffering the tuples in the two sliding windows $S_1[W_1]$ and $S_2[W_2]$, which can be calculated as follows, $$\sigma \cdot (r_1 \cdot W_1 + r_2 \cdot W_2) \qquad (1)$$

With load diffusion, the tuple arrival rate of the stream $S_1$ at each server is reduced to $r_1/k$. Thus, the minimum memory space for buffering the tuples in the sliding windows at a single server is reduced to $$\sigma \cdot \left(\frac{r_1}{k} \cdot W_1 + r_2 \cdot W_2\right) \qquad (2)$$

Without load diffusion, the average number of tuples arrived at the server vi per time unit is $$r_1 + r_2 \qquad (3)$$

The arrived tuples are buffered into the queues of $v_i$. The lengths of the queues are constrained by the available memory space on $v_i$. If the tuple arrival rate is higher than the processor processing rate, the tuples will be dropped when the queue is full. With load diffusion, the average number of tuples arrived at a single server is reduced to $$\frac{r_1}{k} + r_2 \qquad (4)$$

Now consider the processor requirement for processing stream joins. Without load diffusion, a single server needs to perform $r_1 \cdot r_2 \cdot W_2$ join operations for processing $s_1 \chi_A S_2[W_2]$, for all tuples arrived on $S_1$ in this time unit, and $r_2 \cdot r_1 \cdot W_1$ for processing $s_2 \chi_A S_1[W_1]$ for all tuples arrived on $S_2$ in this time unit. With load diffusion, each server only processes a subset of join operations. According to Theorem 1, the single stream partition process does not change the total number of join operations. Since the single stream partition process evenly spreads the workload among all k servers, the average number of join operations required by the join operator for a single server to process per time unit is $$\frac{r_1 \cdot r_2 \cdot (W_1 + W_2)}{k} \qquad (5)$$

The overhead of the single stream partition process is now analyzed. Since the single stream partition process replicates the stream $S_2$ and sends each tuple in the stream $S_2$ to all k servers, the load diffusion proxy pushes more tuples into the stream processing cluster than the original input streams, which is called overhead tuples. The number of overhead tuples generated by the single stream partition process per time unit is $$(k-1) \cdot r_2 \qquad (6)$$

The number of overhead tuples is defined as the overhead of the single stream partition process because they bring extra memory and processor requirements to the whole server cluster for receiving those tuples.

Figure 7:
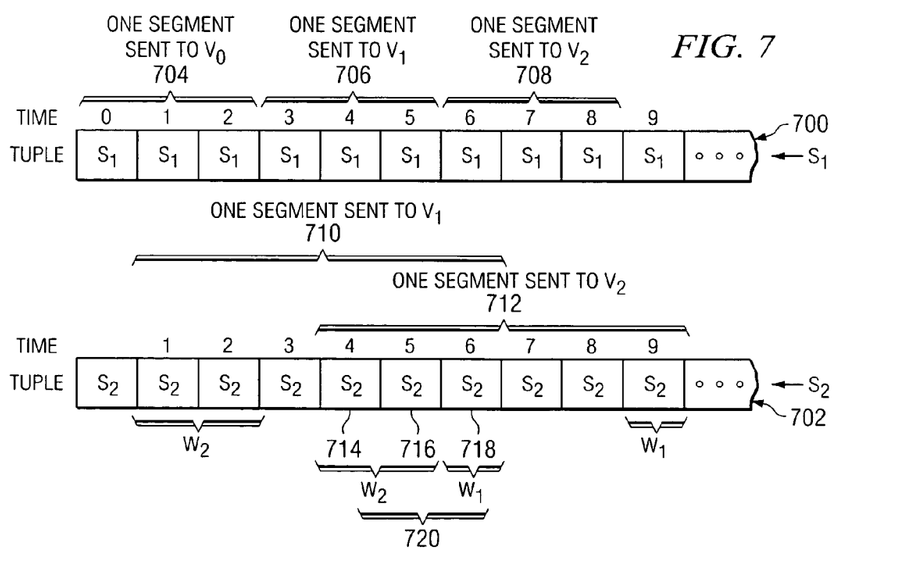
FIG. 7 is a diagram illustrating a coupled stream partition process for diffusing the workload of the stream join operation in accordance with an illustrative embodiment of the present invention.

Turning now to FIG. 7, a diagram illustrating partitioning of two streams for diffusing the workload of the stream join operation is depicted in accordance with an illustrative embodiment of the present invention. This load diffusion process is referred to as a coupled stream partition (CSP) process and simultaneously splits both streams $S_1$ 700 and $S_2$ 702 for spreading the workload among all servers allocated to the join operator.

The basic idea is to continuously partition both streams $S_1$ 700 and $S_2$ 702 into segments, each of which contains the tuples arrived within a certain time period. In this example, stream $S_1$ 700 is partitioned into segments 704, 706, and 708. These segments do not have an overlap. These non-overlapping segments are referred to as disjoint segments. In other words, a particular tuple is not found in more than one segment. As depicted, stream $S_2$ 702 is portioned into segments 710 and 712. These segments are overlapping segments. In other words, the overlapping segments contain common data. In particular, both segments 710 and 712 contain tuples 714, 716 and 718. In these examples, the overlap is identified based on the size of the windows that will be used for the join operation performed by an instance of a join operator on a server.

$S_1(t, t+T)$ is used to denote a segment of stream $S_1$ 700 including all the tuples arrived on stream $S_1$ 700 between time $t$ and $t+T$, where $t$ is called the segment's start time and $T$ is called the segment's length. Different from the sliding window $S_1[W_1]$, each segment $S_1(t,t+T)$ has fixed start time $t$ and end time $t+T$.

The segments of stream $S_1$ 700 and stream $S_2$ 702 are matched into coupled segments based on their start time and end time. The coupled segments are then sent to the same server for producing join results. To meet the correlation constraint of the sliding window join, one of the two joined streams, stream $S_1$ 700 or stream $S_2$ 702 is partitioned into overlapped segments. In these examples, the overlap is illustrated in section 720 and contains tuples 714, 716, and 718. Thus, one of the two streams are partially replicated and the tuples are sent to multiple servers.

Figure 8:
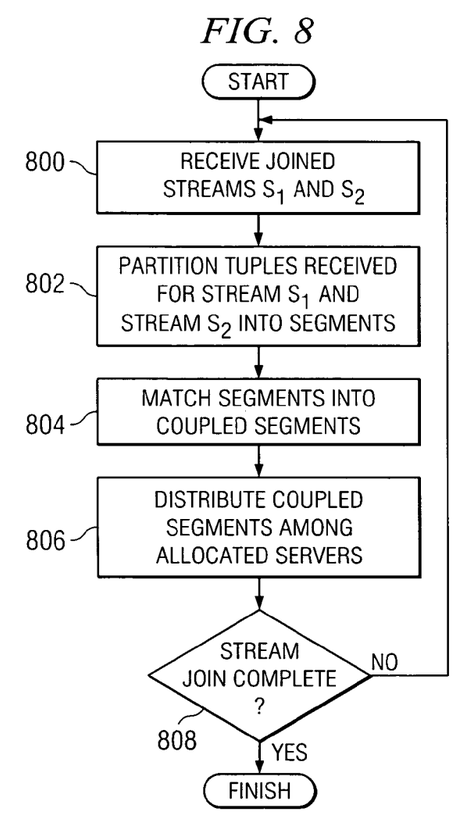
FIG. 8 is a coupled stream partition process for diffusing the workload of the stream join operation in accordance with an illustrative embodiment of the present invention.

Turning now to FIG. 8, a coupled stream partition process for diffusing the workload of the stream join operation is depicted for distributing two data streams for joined operation processing in accordance with an illustrative embodiment of the present invention. The process illustrated in FIG. 8 may be implemented in a data processing system such as load diffusion proxy 302 in FIG. 3.

The process begins by receiving joined streams $S_1$ and $S_2$ (step 800). Tuples received for stream $S_1$ and stream $S_2$ are partitioned into segments (step 802). The segments are matched into coupled segments (step 804), and the coupled segments are distributed to allocated servers (step 806). A coupled segment is a segment that is associated with another segment for processing. Next, a determination is made as to whether stream join is complete (step 808). If the stream join is complete, the process terminates. Otherwise, the process returns to step 800 to receive additional tuples for the joined streams.

One implementation of the coupled stream partition process is described using an example. Consider a join operator $J_i = S_1[W_1] \bowtie_A S_2[W_2]$ between the two streams $S_1$ 700 and $S_2$ 702. The average arrival rates of data for stream $S_1$ 700 and stream $S_2$ 702 are $r_1$ and $r_2$, respectively. Also assume that steam $S_1$ 700 has the non-overlapped segmentation that is called master stream and stream $S_2$ 702 has the overlapped segmentation that is called slave stream. Suppose the load diffusion proxy allocates $k$ servers $\{v_1, \ldots, v_k\}$ to process the join operator $J_i$. Let $t$ denote the start time of the master streams current segment $S_1(t; t+T)$. For all tuples arrived on the stream $S_1$ within the time period $[t, t+T]$, the coupled stream partition process sends all these tuples to the same server $v_i$ that is selected at time $t$. This server should be the least-loaded server at time $t$. At time $t+T$, the coupled stream partition process starts a new segment $S(t+T; t+2T)$ for the master stream $S_1$. It then selects a new least-loaded server $v_j$ at time $t+T$. The tuples belonging to the new segment are sent to this newly selected server $v_j$. The coupled stream partition sends each tuple on the master stream, stream $S_1$ 700, only once since its segments do not have any overlap.

In contrast, the coupled stream partition process splits the slave stream, stream $S_2$ 702, into overlapped segments to meet the correlation constraint. If coupled stream partition sends the segment $S_1(t; t+T)$ to the server $v_i$, coupled stream partition needs to send the segment of the slave stream $S_2(t-W_2; t+T+W_1)$ to the same server $v_i$ to meet the correlation constraint. coupled stream partition process guarantees that the correlated data appears on the same server. Similarly, if coupled stream partition sends the master streams next segment $S_1(t+T; t+2T)$ to the server $v_j$, then coupled stream partition needs to send the slave stream's segment $S_2(t+T-W_2; t+2T+W_1)$ to the same server $v_j$. Thus, the tuples arrived on $S_2$ between the time period $[t+T-W_2; t+T+W_1]$ are sent to both $v_i$ and $v_j$. The number of duplicated tuples is $r_2 \cdot (W_1+W_2)$. For example, in FIG. 7, the load diffusion proxy sends the master stream's segment $S_1(3; 5)$ 704 to the server $v_1$. Given $W_1=1; W_2=2$, coupled stream partition process also sends the slave stream's segment $S_2(1; 6)$ 706 to server $v_1$. The coupled stream partition process diffuses the workload of the join operator $J_i$ among all servers by distributing the tuples of both streams. Each server only shares a partial workload since each server only processes a subset of join operations.

The correctness of the coupled stream partition process that the diffused join operator executes the same set of join operations as the original join operator is proved as follows. $C(J_i)$ and $C'(J_i)$ is used to denote the sets of join operations performed by the original join operator and the diffused join operator, respectively. The correctness of the coupled stream partition process is proved by showing that $C(J_i)=C'(J_i)$.

Theorem 2. Let $C(J_i)$ and $C'(J_i)$ denote the sets of join operations performed by the original join operator and by the new join operator diffused by the coupled stream partition process, respectively. $C(J_i)=C'(J_i)$.

Proof. Prove (1) $C(J_i) \subseteq C'(J_i)$ by showing that (a) $\ldots s_1$, if $s_1 \bowtie_A S_2[W_2] \chi C(J_i)$, then $s_1 \bowtie_A S_2[W_2] \chi C'(J_i)$, and (b) $\ldots s_2$, if $s_2 \bowtie_A S_1[W_1] \chi C(J_i)$, then $s_2 \bowtie_A S_1[W_1] \chi C'(J_i)$. Prove (a) by showing that $\ldots s_1$, if coupled stream partition sends $s_1$ to a server $v_i$, then the coupled stream partition process sends $\ldots s_2 \chi S_2[W_2]$ to $v_i$ too. Suppose $s_1 \chi S_1(t, t+T)$. The coupled stream partition process sends $S_2(t-W_2, t+T+W_1)$ to $v_i$. According to the definition of $S_2[W_2]$, $s_2 \chi S_2(s_1 \cdot t - W_2; s_1 \cdot t)$ is obtained. Because $s_1 \cdot t \chi [t, t+T]$, we have $s_2 \chi S_2(s_1 \cdot t - W_2, s_1 \cdot t)\_S_2(t-W_2, t+T+W_1)$. Then, coupled stream partition also sends $s_2$ to $v_i$. Thus, $s_1 \bowtie_A S_2[W_2] \chi C'(J_i)$ is obtained.

Then prove (b) by showing that $\ldots s_2$ and $\ldots s_1 \chi S_1[W_1]$, coupled stream partition sends a copy of $s_2$ on the machine where $s_1$ is sent. Suppose $s_1$ belongs to the segment $S_1(t, t+T)$ and is sent to the server $v_i$. According to the coupled stream partition process, the load diffusion proxy sends the segment $S_2(t-W_2, t+T+W_1)$ to the same server $v_i$. It is a goal to prove that $s_2$ belongs to the segment $S_2(t-W_2, t+T+W_1)$. According to the definition of the sliding window $S_1[W_1]$, $s_2 \cdot t - W_1 \leq s_1 \cdot t \leq s_2 \cdot t$ is present. Because $s_1$ belongs to the segment $S_1(t; t+T)$, $t \leq s_1 \cdot t \leq t+T$ is obtained. Thus, $s_2 \cdot t > s_1 \cdot t > t$ and $s_2 \cdot t \leq s_1 \cdot t + W_1 < t + T + W_1$ is present. Thus, $s_2$ belongs to the segment $S_2(t-W_2, t+T+W_1)$, which is also sent to $v_i$. Thus, $s_2 \bowtie_A S_1[W_1] \chi C'(J_i)$, $\ldots s_2$ is obtained Combining (a) and (b), $C(J_i) \subseteq C'(J_i)$ is obtained.

Then prove (2) $C'(J_i) \subseteq C(J_i)$. The proof is straightforward since any join operation in $C'(J_i)$ follows the windowed join definition, which thus should appear in $C(J_i)$, too. Moreover, since $\ldots s_1 \chi S_1$ does not appear on two different servers, coupled stream partition does not perform duplicated join operations. Thus, $C'(J_i) \subseteq C(J_i)$ is obtained. Combining (1) and (2), $C(J_i)=C'(J_i)$ is obtained.

The memory requirement of the coupled stream partition process for processing the windowed join operator $J_i = S_1[W_1] \bowtie_A S_2[W_2]$ is analyzed. The coupled stream partition process evenly distributes both streams among all $k$ servers. The average arrival rate of stream $S_1$ becomes $$\frac{r_1}{k}.$$

For each segment $[t, t+T]$, the coupled stream partition sends extra tuples on stream $S_2$ to meet the correlation constraint, whose number is $r_2 \cdot (W_1+W_2)$. On average, the coupled stream partition process selects $v_i$ once every $k \cdot T$ time. Thus, the average arrival rate of stream $S_2$ becomes $$\frac{r_2}{k} + \frac{r_2 \cdot (W_1 + W_2)}{k \cdot T}.$$

Each server needs a minimum memory space to buffer the tuples of the two sliding windows $S_1[W_1]$ and $S_2[W_2]$, which can be calculated as follows, where a denotes the average tuple size, $$\sigma \cdot \frac{1}{k} \cdot (r_1 \cdot W_1 + r_2 \cdot W_2) + \sigma \cdot \frac{r_2}{k} \cdot W_2 \cdot \left(\frac{W_1 + W_2}{T}\right) \quad (7)$$

Without load diffusion, the average tuple arrival rate is $r_1 + r_2$. With load diffusion, the average number of tuples arrived at a single server per time unit is $$\frac{r_1}{k} + \frac{r_2}{k} + \frac{r_2}{k} \cdot \left(\frac{W_1 + W_2}{T}\right) \quad (8)$$

Similar to the single stream partition process, the coupled stream partition process does not change the total number of join operations. Compared to the original join operator, the coupled stream partition process reduces the average number of join operations executed at each server to one k'th of the original required join operations.

In terms of the process overhead, the coupled stream partition process pushes more tuples into the server cluster due to the partial replication of the stream $S_2$. For each segment $S_1(t, t+T)$ over the time period T, the coupled stream partition process introduces $r_2 \cdot (W_1+W_2)$ more tuples than the original input streams $S_1$ and $S_2$. Thus, the number of extra tuples generated by the coupled stream partition process per time unit is $$\frac{r_2 \cdot (W_1 + W_2)}{T} \quad (9)$$

These extra tuples are defined as the overhead of the coupled stream partition process since they bring extra memory requirement for buffering tuples and extra CPU requirement for receiving tuples at each server.

Figure 9:
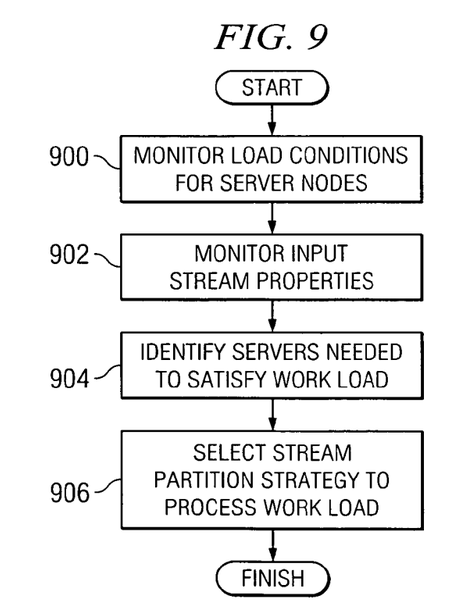
FIG. 9 is a flowchart of a process for dynamically selecting stream partition strategies in accordance with an illustrative embodiment of the present invention.

With reference next to FIG. 9, a flowchart of a process for dynamically selecting stream partition strategies is depicted in accordance with an illustrative embodiment of the present invention. The process illustrated in FIG. 9 may be implemented in a load diffusion proxy, such as load diffusion proxy 302 in FIG. 3.

The process begins by monitoring load conditions for server nodes (step 900). The input stream properties are monitored (step 902). The servers needed to satisfy work load are identified (step 904). Stream partition strategies are selected to process the work load (step 906), with the process terminating thereafter.

Different load diffusion adaptation strategies may be implemented in load proxy server based on the analysis describe above. The load diffusion system adapts to dynamic stream environments at two different levels: (1) micro-adaptations within each algorithm by adjusting algorithm parameters and (2) macro-adaptations across algorithms by switching between different processes.

Micro-adaptation in single stream partition process may be used in these examples. The single stream partition process can evenly spread the number of join operations for processing a single windowed join operator $J_i = S_1[W_1] \bowtie_A S_2[W_2]$ among all k servers. Theorem 1 shows that the single stream partition process does not introduce extra join operations. Each server shares a subset of the original join workload as described by Equation 5. Thus, as more servers are allocated to the join operator (i.e., k is larger), each server has a smaller workload. However, due to the full replication of stream $S_2$ at each server, the memory requirement reduction at each server is only related to the properties of the partitioned stream $S_1$. According to Equation 1 and Equation 2, the sliding window memory requirement reduction is proportional to the product $r_1 \cdot W_1$ and the number of servers k. According to Equation 3 and Equation 4, the tuple arrival rate reduction is proportional to $r_1$ and k. In contrast, the overhead of the single stream partition process is only related to the property of the replicated stream $S_2$. Equation 6 shows that the overhead of the single stream partition process is proportional to $r_2$ and k.

In a dynamic stream environment, the arrival rates of both streams can greatly change over time. The sliding window sizes can also change as the user updates the continuous query specifications. In order to maximize the memory requirement reduction and minimize algorithm overhead, the single stream partition process adaptively selects the stream that has larger value of $r_i \cdot W_i$, i=1; 2, as the partitioned stream, and the other stream as the replicated stream. The load diffusion proxy estimates the arrival rate of each stream by counting the number of arrived tuples on each stream within a sampling period. The average arrival rate of the input stream can be estimated by dividing the counted tuple number by the sampling period. In this manner, changes in the stream rate may be used to select which stream in a stream pair is the replicated stream and which stream is the partitioned stream. This selection may be made dynamically during processing of a stream pair. The process may make the partition stream the replicated stream in the middle of processing a stream pair Micro-adaptation in the coupled stream partition process also may be used to dynamically adjust processing of streams to optimize performance. Similar to the single stream partition process, the coupled stream partition process can evenly spread the join operations for processing the windowed join operator $J_i = S_1(W_1] \bowtie_A S_2[W_2]$ among all k servers. Theorem 2 shows that the coupled stream partition process does not introduce extra join operations while splitting both streams. However, different from the single stream partition process, the memory requirement reduction at each server is related to the properties of both streams since both of them are partitioned and distributed among k servers. According to Equation 1 and Equation 7, the sliding window memory requirement reduction by the coupled stream partition process is decided by the rates $r_1$, $r_2$ and sliding window sizes $W_1$; $W_2$ of both streams $S_1$ and $S_2$, the server number k, and the segment length T. Larger segment length T leads to more memory requirement reduction at each server. Equation 8 shows that the coupled stream partition process can reduce the arrival rates of both streams at each server. The more servers used (i.e., k is larger) and the larger the segment length T is, the more arrival rate reduction the coupled stream partition process achieves.

In contrast, the overhead of the coupled stream partition process, shown by Equation 9, is only related to $r_2$ since only stream $S_2$ is partially replicated on multiple servers. Since the overhead is proportional to $r_2$, the coupled stream partition process adaptively selects the slower stream as the slave stream and the faster stream as the master stream. Moreover, a larger segment length T means less overhead since the extra cost in the overlapped segmentation is amortized over a longer time period. The above analysis implies that the coupled stream partition process should use large segment length for reducing the overhead. However, on the other hand, a large segment length also means coarse-grained load distribution since a large number of tuples in two larger segments S(t, t+T) and S(t−$W_2$, t+T+$W_1$) are constrained to be sent to the same server. One extreme case is that if coupled stream partition process sets the segment length as infinite (i.e., T=∞), the join processing is reduced to non-diffused join operator where data streams are sent a single server.

Thus, the coupled stream partition process may adaptively adjust the segment length to adapt to dynamic stream environments for achieving the optimal performance. The performance of the load diffusion algorithm is evaluated using the throughput metric that is defined as the number of join operations performed by the whole server cluster over a period of time. Better load diffusion algorithm can achieve higher throughput for a given set of join operators and servers. Currently, the load diffusion proxy uses a simple sampling technique to find the optimal segment length for the coupled stream partition process. The load diffusion proxy starts from the base segment length T=1 and gradually increases T until the measured throughput decreases. The last sampled segment length is selected as the optimal segment length for the current system conditions. When the stream environment experiences significant changes (i.e., stream rate variations, server removals/additions), the load diffusion proxy triggers the above sampling process to find a new optimal segment length.

Macro-adaptation may be used to select different distribution processes, such as between the single stream partition process and the coupled stream partition process. The major difference between single stream partition process and coupled stream partition lies in (1) load balancing granularity and (2) process overhead. The single stream partition process can achieve the most fine-grained load balancing for the partitioned stream since it can route each tuple on the partitioned stream independently to any allocated server. In contrast, the coupled stream partition process distributes both streams with a certain granularity defined by the segment length T. A larger segment length T means coarser granularity since a bigger chunk of tuples is constrained to be sent to the same server. In terms of overhead comparison, the single stream partition process overhead is proportional to the server number k (Equation 6) while the overhead of the coupled stream partition process is independent of k (Equation 9). Thus, the coupled stream partition process should allow each join operator to access all servers in the computer cluster to fully utilize all available resources in the system. In contrast, the single stream partition process should use minimum number of servers for each join operator to avoid excessive overhead. In the following theorem, Theorem 3, the single stream partition process has more overhead than the coupled stream partition process if $$k > \frac{(W_1 + W_2 + T)}{T}.$$

Proof. According to Equation 6 and Equation 9, the single stream partition process has less overhead than the coupled stream partition process if $$(k-1) \cdot r_2 > \frac{(W_1 + W_2)}{T} \cdot r_2.$$

Thus, the theorem holds. Theorem 3 indicates that the trade-off between single stream partition process and coupled stream partition depends only on the number of servers k, the sliding window sizes $W_1$ and $W_2$, and the segment length T. For example, if the workload of a join operator can be satisfied by a small number of servers, the sliding window sizes are big, and the segment length is small, the single stream partition process has less overhead than the coupled stream partition process. Otherwise, the coupled stream partition process is more cost-efficient. The load diffusion proxy adaptively switches between the single stream partition process and the coupled stream partition process based on Theorem 3.

Thus, the different aspects of the present invention provide a method, apparatus, and computer useable program code for efficiently processing stream joins using a cluster of servers. In the different illustrative examples, the load diffusion scheme is implemented as a middleware proxy service that employs a set of stream partition processes to adaptively diffuse stream join workload among distributed servers. To the best of our knowledge, this is the first work that studied distributed execution of stream joins using correlation-aware stream partitions. The examples use two stream partition processes, single stream partition (SSP) and coupled stream partition (CSP) for diffusing the workload of stream joins among distributed servers under the correlation constraint.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. For example, the illustrative examples are shown using single stream partition processes and couple stream partition processes. Other partition processes may be used that follow the constraints for processing pairs of streams. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for providing load diffusion to perform a join operation over a data stream pair using a distributed stream processing system, the computer implemented method comprising:
   receiving the data stream pair for correlation, wherein the data stream pair comprises data, wherein the data are tuples, and wherein the data stream pair includes a first stream and a second stream;
   partitioning the data stream pair using correlation constraints to form a partitioned data stream pair, wherein the data stream pair is partitioned in a single stream partition process or a coupled stream partition process, wherein the single stream partition process further comprises:
      partitioning the first stream into portions;
      replicating the second stream on each node in a set of server nodes;
      distributing the portions to different nodes within the set of server nodes; and
      switching a replicated stream selection and a partitioned stream selection based on stream rate changes;
   wherein the coupled stream partition process further comprises:
      partitioning the first stream into disjoint segments;
      partitioning the second stream into overlapped segments;
      grouping the disjoint segments and the overlapped segments into coupled segments according to the correlation constraints;
      distributing the coupled segments among the set of server nodes;
      dynamically switching a master stream selection and a slave stream selection based on the stream rate changes; and
      adjusting a segment length based on changes in the set of server nodes processing the data stream pair;
   switching between the single stream partition process and the coupled stream partition process based on how many nodes in the set of server nodes, sliding window sizes, and the segment length;
   distributing the partitioned data stream pair among the set of server nodes for load diffusion;
   monitoring load conditions of nodes within the set of server nodes; and
   monitoring arrival rates of the data stream pair.

* * * * *